US010861414B2

(12) United States Patent
Kasuno

(10) Patent No.: US 10,861,414 B2
(45) Date of Patent: Dec. 8, 2020

(54) STORAGE MEDIUM, INFORMATION PROCESSING SYSTEM, INFORMATION PROCESSING APPARATUS AND INFORMATION PROCESSING METHOD

(71) Applicant: NINTENDO CO., LTD., Kyoto (JP)

(72) Inventor: Shinichi Kasuno, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/424,665

(22) Filed: May 29, 2019

(65) Prior Publication Data
US 2019/0378472 A1    Dec. 12, 2019

(30) Foreign Application Priority Data

Jun. 6, 2018    (JP) .................................. 2018-108606

(51) Int. Cl.
*G09G 5/02*    (2006.01)
*A63F 13/63*   (2014.01)
(Continued)

(52) U.S. Cl.
CPC ............. *G09G 5/026* (2013.01); *A63F 13/63* (2014.09); *G06F 3/0304* (2013.01);
(Continued)

(58) Field of Classification Search
CPC ...... G09G 5/026; G09G 5/38; G09G 2340/12; G06K 9/00671; G06F 2111/18; G06T 19/006
See application file for complete search history.

(56) References Cited

U.S. PATENT DOCUMENTS 5,999,190 A    12/1999  Sheasby et al.
9,652,897 B2 *  5/2017  Osborn ................... G06T 19/20
(Continued)

FOREIGN PATENT DOCUMENTS

JP    7-37112    2/1995
JP    10-320578  12/1998
(Continued)

OTHER PUBLICATIONS

"VR Ghost Paint" Seymour, Michael. Fxguide.com. Aug. 2, 2017—https://www.fxguide.com/quicktakes/vr-ghost-paint/ (Year: 2017).*
(Continued)

*Primary Examiner* — Antonio A Caschera
(74) *Attorney, Agent, or Firm* — Nixon & Vanderhye, P.C.

(57) ABSTRACT

A game system that is a non-limiting example information processing system includes a game apparatus, and an input device and a television are connected to the game apparatus. If graphics software is executed and coloring processing is started, a virtual object is displayed, and when a mask mode is set, a real space is imaged by an infrared imaging unit provided on the input device. A candidate image based on an imaging result is generated, and according to a fixing instruction by a user, the candidate image is fixedly displayed, as a mask image, in the front of an image including the virtual object. When a coloring instruction is input, an area of the virtual object image not overlapping with the mask image is colored and color information of the virtual object image is updated, whereas, an area overlapping with the mask image is not colored and the update of the color information is restricted.

17 Claims, 15 Drawing Sheets

(51) Int. Cl.
*G06F 3/03* (2006.01)
*G06F 3/0346* (2013.01)
*G09G 5/38* (2006.01)

(52) U.S. Cl.
CPC ............ *G06F 3/0346* (2013.01); *G09G 5/38* (2013.01); *G09G 2320/0666* (2013.01); *G09G 2340/0464* (2013.01); *G09G 2340/12* (2013.01); *G09G 2354/00* (2013.01)

(56) References Cited

U.S. PATENT DOCUMENTS

| | | | |
|---|---|---|---|
| 2008/0043022 A1 | 2/2008 | Ishihara | |
| 2011/0304611 A1 | 12/2011 | Suzuki | |
| 2016/0210783 A1* | 7/2016 | Tomlin | G06T 19/006 |
| 2018/0075657 A1* | 3/2018 | Lanier | G06F 3/04845 |

FOREIGN PATENT DOCUMENTS

| | | |
|---|---|---|
| JP | 11-73491 | 3/1999 |
| JP | 2008-43589 | 2/2008 |

OTHER PUBLICATIONS

Extended European Search Report dated Oct. 15, 2019 issued in European Application No. 19176727.6 (8 pgs.).
Mediacollege.com: "Photoshop Clone Stamp Tool", Feb. 19, 2018, retrieved from the internet: URL:https://web.archive.org/web/20180219062736/https://www.mediacollege.com/adobe/photoshop/tool/clone.html Retrieved on Sep. 16, 2019 (2 pgs.).
Anonymous: "Wii Remote—Wikipedia, the free encyclopedia", Wikipedia, 19 Dec. 2009, retrieved from the internet: URL:https://en.wikipedia.org/w/index.php?title=Wii_Remote&oldid=332617751; retrieved on Sep. 7, 2015 (16 pgs.).
Notification of Reason(s) for Refusal dated Oct. 15, 2019 issued in corresponding JP Application No. 2018-108606 (3 pgs.) and its translation (3 pgs).
Hiroyuki Hayakawa et al., Become a Sokuseki Photoshopper!, Nikkei MAC, Japan, published by Nikkei Business Publications, Inc. on Feb. 18, 2000, vol. 8 Item 3, pp. 74-83 (11 pgs.).
Office Action in European Application No. 19 176 727.6-1210 dated Oct. 8, 2020 (6 pages).
Stencil Buffer—Wikipedia (retrieved on Dec. 18, 2018) (3 pages).

* cited by examiner

STRAP  RIGHT HAND

STORAGE MEDIUM, INFORMATION PROCESSING SYSTEM, INFORMATION PROCESSING APPARATUS AND INFORMATION PROCESSING METHOD

CROSS REFERENCE OF RELATED APPLICATION

The disclosure of Japanese Patent Application No. 2018-108606 filed on Jun. 6, 2018 is incorporated herein by reference.

FIELD

This application describes a storage medium, information processing system, information processing apparatus and information processing method, updating color information of an image.

SUMMARY

It is a primary object of an embodiment(s) to provide a novel storage medium, information processing system, information processing apparatus and information processing method.

Moreover, it is another object of the embodiment(s) to provide a storage medium, information processing system, information processing apparatus and information processing method, capable of easily update color information of an image.

A first embodiment is a non-transitory storage medium storing an information processing program executable by a computer of an information processing apparatus, wherein the information processing program causes one or more processors of the computer to perform an image acquiring step; a display control step; and an updating step. The image acquiring step is configured to sequentially acquire images including at least a subject in a real space from an imaging unit configured to image the subject. The display control step is configured to display on a display portion a first image corresponding to the subject included in the images, and a second image that is different from the first image. The updating step is configured to update color information of the second image. Moreover, the updating step is configured to restrict, when there is an overlapping area of the first image and the second image, update of the color information of the second image in at least a part of the overlapping area.

According to the first embodiment, since the color information of the second image is updated with using the first image that corresponds to a subject in a real space and is included in the images sequentially acquired by imaging the subject, it is possible to easily perform update of the color information of the image.

A second embodiment is the storage medium according to the first embodiment, wherein the information processing program further causes the one or more processors to perform a position fixing step. The position fixing step is configured to fix a display position of the first image.

According to the second embodiment, the display position of the first image is fixed, so that it is possible to easily perform the update of the color information because it is not necessary to continue to fix the subject in the real space at the same position.

A third embodiment is the storage medium according to the first embodiment, wherein the information processing program further causes the one or more processors to perform a position fixing step. The position fixing step is configured to fix a display position of the first image during when the color information of the second image is being updated in the updating step.

According to the third embodiment, the display position of the first image is fixed, so that it is possible to easily perform the update of the color information because it is not necessary to continue to fix the subject in the real space at the same position.

A fourth embodiment is the storage medium according to the second embodiment, wherein the information processing program further causes the one or more processors to perform an instruction determining step. The instruction determining step is configured to determine whether an input device receives an updating instruction by the user. The position fixing step is configured to fix the display position of the first image when it is determined in the instruction determining step that the input device receives the updating instruction by the user.

According to the fourth embodiment, since the display position of the first image is fixed when there is the updating instruction by the user, it is possible to easily update the color information because the display position of the first image can be easily fixed at a desired position by an intuitive operation.

A fifth embodiment is the storage medium according to the second embodiment, wherein the information processing program further causes the one or more processors to perform an instruction determining step and a fixation canceling step. The instruction determining step is configured to determine whether an input device receives an updating instruction by the user. When it is determined in the instruction determining step that the updating instruction by the user is not received after fixing the display position of the first image in the position fixing step, the fixation of the display position of the first image is canceled in the fixation canceling step.

According to the fifth embodiment, it is possible to fix the display position of the first image only while the updating instruction is being received. Accordingly, since the first image is not fixed while not receiving the updating instruction, a place that the color information is to be updated can be changed after fixing the display position of the first image.

A sixth embodiment is the storage medium according to the first embodiment, wherein the information processing program further causes the one or more processors to perform a shape fixing step. The shape fixing step is configured to fix a shape of the first image when the color information of the second image is being updated in the updating step.

According to the sixth embodiment, since the shape of the first image is fixed when there is the updating instruction by the user, it is possible to easily update the color information while fixing the shape of the first image to a desired shape by an intuitive operation.

A seventh embodiment is the storage medium according to the first embodiment, wherein the imaging unit is an infrared imaging unit.

According to the seventh embodiment, since the infrared imaging unit is used, the first image can be displayed even in a dark place.

An eighth embodiment is the storage medium according to the first embodiment, wherein the display control step is configured to display an image of a virtual object on the display portion as the second image, and the updating step is configured to update the color information of the image of the virtual object.

According to the eighth embodiment, it is possible to easily perform update of the color information of the image of the virtual object.

A ninth embodiment is the storage medium according to the first embodiment, wherein the information processing program further causes the one or more processors to perform a coordinate acquiring step. The coordinate acquiring step is configured to acquire an input coordinate based on an output from a pointing device. The updating step is configured to update the color information of a portion corresponding to the input coordinate in the second image.

According to the ninth embodiment, it is possible to easily update the color information of the portion corresponding to a desired coordinate in the second image.

A tenth embodiment is the storage medium according to the ninth embodiment, wherein the pointing device comprises at least one of a motion sensor and an imaging unit, and the coordinate acquiring step is configured to acquire the input coordinate based on motion data detected by the at least one of the motion sensor and the imaging unit.

According to the tenth embodiment, it is possible to easily update the color information of the portion corresponding to the desired coordinate in the second image by moving the pointing device.

An eleventh embodiment is an information processing system including an input device comprising an imaging unit that images a subject in a real space, comprising: an image acquiring portion; a display control portion; and an updating portion. The image acquiring portion is configured to sequentially acquire images including at least the subject from the input device. The display control portion is configured to display on a display portion a first image corresponding to the subject included in the image, and a second image different from the first image. The updating portion is configured to update color information of the second image. Moreover, the updating portion is configured to restrict, when there is an overlapping area of the first image and the second image, update of the color information of the second image in at least a part of the overlapping area.

According to the eleventh embodiment, as similar to the first embodiment, it is possible to easily perform update of the color information.

A twelfth embodiment is the information processing system according to the eleventh embodiment, wherein the input device comprises a motion sensor that outputs motion data indicative of a motion of the input device, and further comprising: a coordinate acquiring portion configured to acquire a coordinate in a predetermined plane according to the motion data; and a position fixing portion configured to fix a display position of the first image when the color information of the second image is updated by the updating portion. The updating portion updates the color information of a portion in the second image corresponding to the coordinate, and when there is an overlapping area of the first image that the display position is fixed and the second image, restricts update of the color information of the second image in at least a part of the overlapping area.

According to the twelfth embodiment, it is possible to easily update the color information of the portion corresponding to a desired coordinate in the second image by moving the input device.

A thirteenth embodiment is an information processing apparatus, comprising: an image acquiring portion; a display control portion; and an updating portion. The image acquiring portion is configured to sequentially acquire images including at least a subject in a real space from an imaging unit configured to image the subject. The display control portion is configured to display on a display portion a first image corresponding to the subject included in the image, and a second image different from the first image. The updating portion is configured to update color information of the second image. Moreover, the updating portion is configured to restrict, when there is an overlapping area of the first image and the second image, update of the color information of the second image in at least a part of the overlapping area.

A fourteenth embodiment is an information processing method, comprising steps of: (a) an image acquiring step configured to sequentially acquire images including at least a subject in a real space from an imaging unit configured to image the subject; (b) a display control step configured to display on a display portion a first image corresponding to the subject included in the image, and a second image different from the first image; and (c) an updating step configured to update color information of the second image, wherein the step (c) is configured to restrict, when there is an overlapping area of the first image and the second image, update of the color information of the second image in at least a part of the overlapping area.

According also to each of the thirteenth embodiment and the fourteenth embodiment, like the first embodiment, it is possible to easily perform update of color information of the image.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

Figure 1:
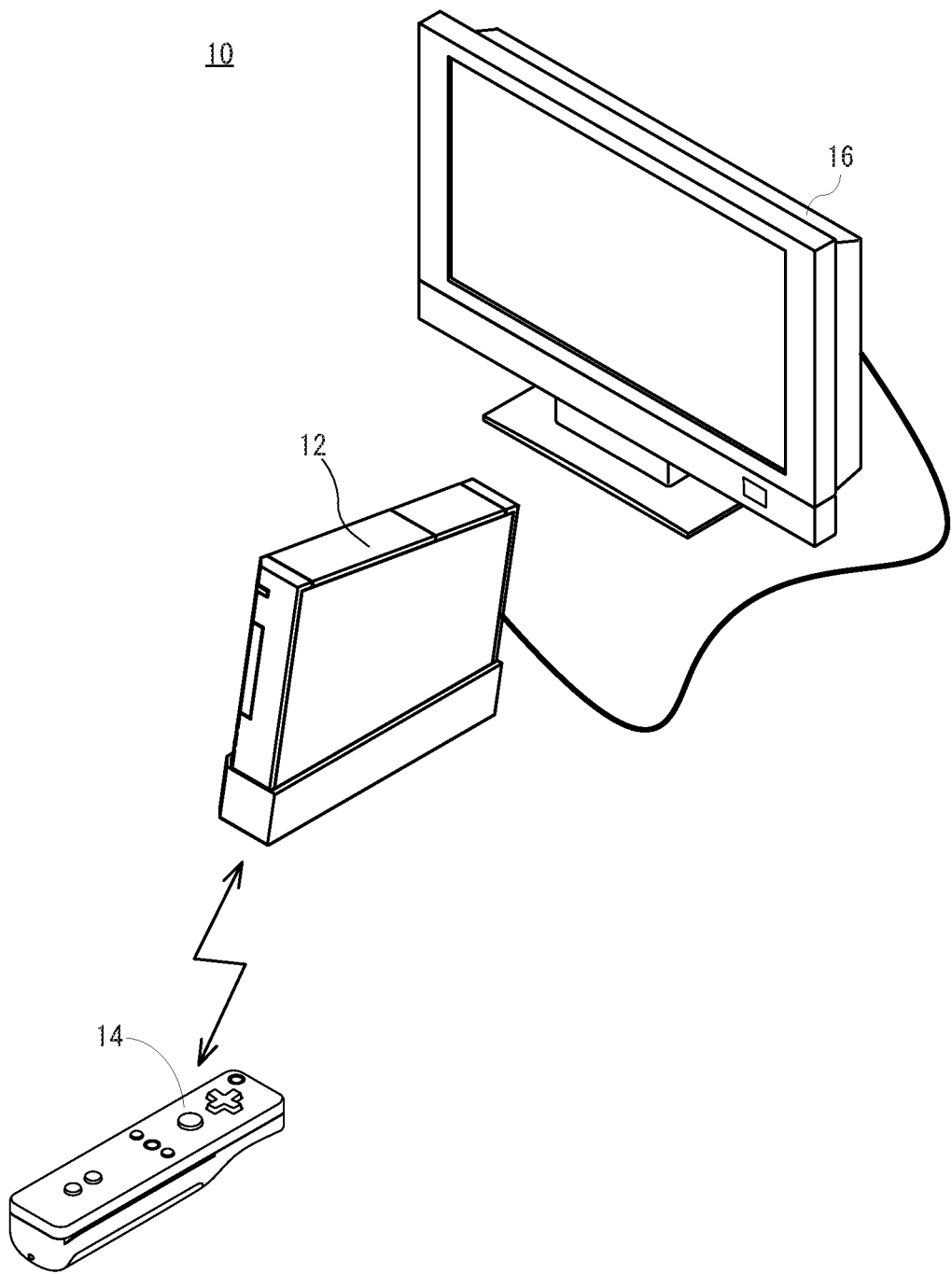
FIG. 1 is an appearance view showing a non-limiting example game system.

With reference to drawings, a non-limiting example game system 10 according to an embodiment will be described. The game system 10 is a non-limiting example information processing system. As shown in FIG. 1, the game system 10 includes a stationary game apparatus 12 and a portable input device 14. Moreover, the game system 10 includes a stationary display device 16 typified by a television receiver or the like (hereinafter, referred to as "television"), and the game apparatus 12 and the television 16 are connected to each other via a connection cable. In this game system 10, the game apparatus 12 performs game processing based on game operations using the input device 14, and game images obtained by the game processing are displayed on the television.

The television 16 displays an image of information processing obtained as a result of information processing such as the game processing performed by the game apparatus 12 (hereinafter, referred to as "display image"). The television 16 has a speaker and the speaker outputs a game sound obtained as a result of the above-mentioned information processing.

In addition, in other embodiments, the game apparatus 12 and the stationary display device may be integrated. Moreover, communication between the game apparatus 12 and the television 16 may be wireless communication.

The input device 14 transmits and receives data to and from the game apparatuses 12 at least. A user or player (hereinafter, simply referred to as "user") can use by moving the input device 14 with holding the input device 14 in hand or arranging the input device 14 in an arbitrary position. The input device 14 is provided with various kinds of input means as mentioned later. Moreover, the input device 14 can communicate with the game device 12 via wireless communication using Bluetooth (Registered trademark) technology.

Figure 2:
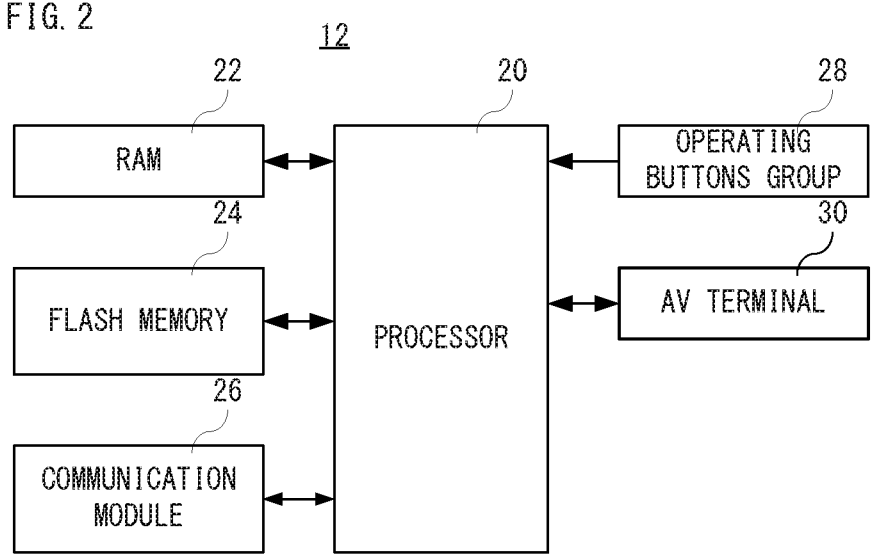
FIG. 2 is a block diagram showing a non-limiting example electric configuration of a game apparatus shown in FIG. 1.

FIG. 2 is a block diagram showing a non-limiting example electric configuration of the game apparatus 12 shown in FIG. 1. As shown in FIG. 2, the game apparatus 12 includes a processor 20, and the processor 20 is connected to a RAM 22, a flash memory 24, a communication module 26, an operating buttons group 28 and an AV terminal 30.

The processor 20 is in charge of overall control of the game apparatus 12. Specifically, the processor 20 is an SoC (System-on-a-Chip) incorporating functions of a CPU and a GPU. The RAM 22 is a volatile storage medium, and used as a working memory and a buffer memory for the processor 20. The flash memory 24 is a nonvolatile storage medium, and used in order to store an application program such as a game, i.e., an information processing program, and to store (save) various kinds of data. For example, an application program is read out from the flash memory 24 to be stored in the RAM 22. The game apparatus 12 performs information processing such as game processing etc. by executing the information processing program stored in the RAM 22. That is, the game apparatus 12 functions as an information processing apparatus.

In addition, an application program may be read from an external memory such as an SD card, a memory stick or an optical disk each being attachable to and detachable from the game apparatus 12 to be stored in the RAM 22. Moreover, the game apparatus 12 may download an information processing program from an external computer that is communicably connected to the game apparatus 12 to be stored in the RAM 22. However, a part of the information processing program may be stored in the flash memory 24 and another part(s) may be acquired from an optical disk or an external computer. As to these, any one method or two or more methods can be adopted.

However, the information program does not need to be limited to the game program, and various kinds of application programs such as an application program for a function of the game apparatus 12 (hereinafter, referred to as "main body function"), a document creation application program, an email application program, a drawing application program (or graphics software), a character practice application program, a language training application program, a learning application program, etc. correspond to the information processing program.

The communication module 26 performs wireless communication with the input device 14. As described above, in this embodiment, a communication system according to Bluetooth (Registered trademark) standard is adopted. However, it is possible to adopt an arbitrary system as a communication system between the game apparatus 12 and the input device 14.

The operating buttons group 28 includes a power button, a rest button, etc. The AV terminal 30 is a terminal for connecting with the television 16 using a connection cable such as HDMI (Registered trademark) cable.

In addition, the electric configuration of the game apparatus 12 shown in FIG. 2 is a mere example, and it does not need to be limited to this. In other embodiments, the input device 14 may be wired to the game apparatus 12.

Figure 3A:
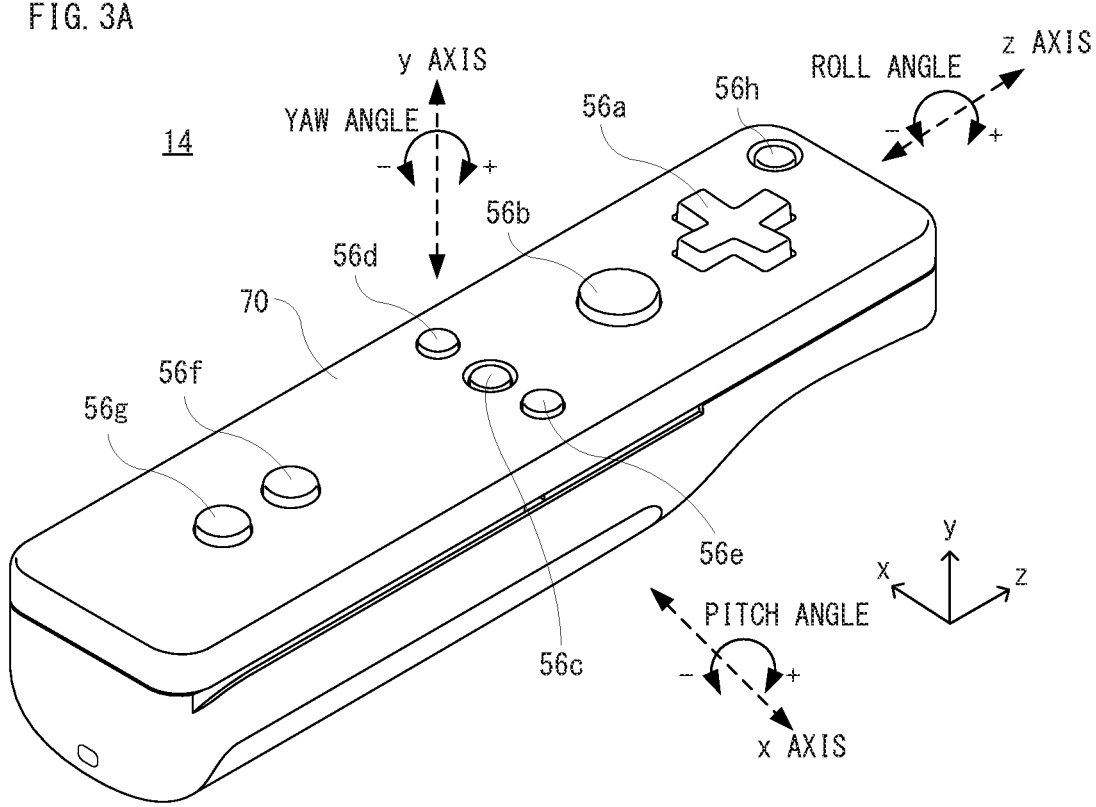
FIG. 3A is a perspective view showing a front surface, a top surface and a right side surface of a non-limiting example input device.
Figure 3B:
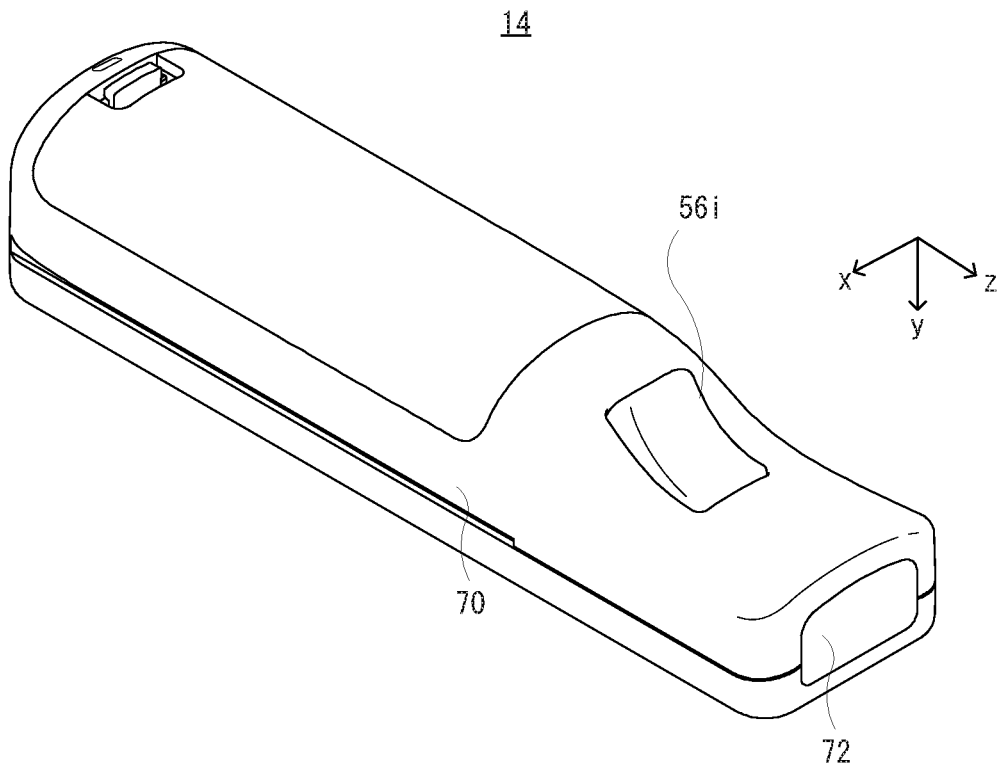
FIG. 3B is a perspective view showing a rear surface, a bottom surface and a left side surface of the input device.

FIG. 3A and FIG. 3B show a non-limiting example appearance of the input device 14. FIG. 3A is a perspective view showing a front surface of the input device 14, a top surface and a right side surface, and FIG. 3B is a perspective view showing a rear surface, a bottom surface and a left side surface of the input device 14.

With referring to FIG. 3A and FIG. 3B, the input device 14 has a housing 70 that is formed by plastic molding, for example. The housing 70 has a substantially rectangular parallelepiped shape, and has a size that the user can grasp or hold it with one hand. The housing 70 (or the input device 14) is provided with a plurality of buttons or switches 56a-56i (hereinafter, these buttons or switches may be referred to as "operating buttons group 56" collectively). Specifically, as shown in FIG. 3A, on the top surface of the housing 70, there are provided with a cross key 56a, an A button 56b, a home button 56c, a − (minus) button 56d, a + (plus) button 56e, a "1" button 56f, a "2" button 56g and a power switch 56h. Moreover, as shown in FIG. 3B, an inclined surface is formed on the bottom surface of the housing 70, and a B button 56i is provided on this inclined surface.

The cross key 56a is a direction input key, and used in order to move a virtual object or a virtual camera, or to select a virtual object. The A button 56b is a push-button switch, and is used in order to cause the virtual object to perform an motion other than direction designation, and to execute a command.

The home button 56c and the power switch 56h are also push-button switches. The home button 56c is used in order to display a menu screen. The power switch 56h is used in order to turn a power of the game apparatus 12 on or off through remote control.

The − (minus) button 56d, the + (plus) button 56e, the "1" button 56f and the "2" button 56g are push-button switches, respectively, and used in order to select an operation mode, and to perform an operation for adjusting a distance of the virtual camera, i.e., a viewpoint with respect to a gazing point, or adjusting an angle of view of the virtual camera when displaying a three-dimensional image.

The B button 56i is also a push-button switch, and mainly used in order to cancel an action, a command or the like determined by the A button 56b.

In addition, respective functions of the buttons in the operating buttons group 56 are mere examples, and should not be limited, and can be arbitrarily changed according to types of programs to be executed.

Moreover, the input device 14 has an infrared imaging unit 58 and an infrared light-emitting unit 60 (see FIG. 4), and as shown in FIG. 3B, a window portion 72 for emitting the infrared light in order to image an infrared image is provided in a tip end surface of the housing 70. That is, the infrared imaging unit 58 and the infrared light-emitting unit 60 are arranged within an inside of the housing 70 near the tip end surface (or the window portion 72) of the housing 70.

The infrared imaging unit 58 images surroundings of the input device 14 through the window portion 72 while making a direction toward the tip end of the input device 14 (a plus direction in the z axis shown in FIG. 3A) be an imaging direction. That is, the infrared imaging unit 58 images a real space. The infrared light-emitting unit 60 irradiates the infrared light through the window portion 72 to an imaging target (subject) to be imaged by the infrared imaging unit 58 while making a predetermined range around the tip end of the input device 14 be an irradiation range.

The window portion 72 is for protecting a lens of a camera of the infrared imaging unit 58, a light-emitting device of the infrared light-emitting unit 60, etc., and formed of a material that transmits the light having a wavelength that can be sensed by the camera and the light emitted from the light emitting device, e.g., a transparent material. In addition, the window portion 72 may be a through hole formed in the housing 70. Moreover, in this embodiment, the infrared imaging unit 58 itself has a filter member for inhibiting or suppressing transmission of light of a wavelength other than the light (infrared light in this embodiment) having a wavelength that can be sensed by the camera. However, in other embodiments, the window portion 72 may have a filter function.

Furthermore, the input device 14 has an angular velocity sensor 62 (see FIG. 4), and the angular velocity sensor 62 detects respective angular velocities around three axes of the input device 14, i.e., an angular velocity around a longitudinal direction (around the z-axis), an angular velocity around a lateral direction (around the x-axis) and an angular velocity around a front-back direction (around the y-axis). However, rotation around the y-axis is represented by a yaw angle, rotation around the x-axis is represented by a pitch angle, and rotation around the z-axis rotation is represented by a roll angle. Typically, a piezoelectric vibration type gyro sensor can be used as this angular velocity sensor 62, but another type of angular velocity sensor may be used.

In addition, it should be noted that a shape of the input device 14 as shown FIGS. 3A and 3B, a shape and an arranged position of each of the buttons and the number of the buttons in the operating buttons group 56, etc. are mere examples, and these may be appropriately modified.

Figure 4:
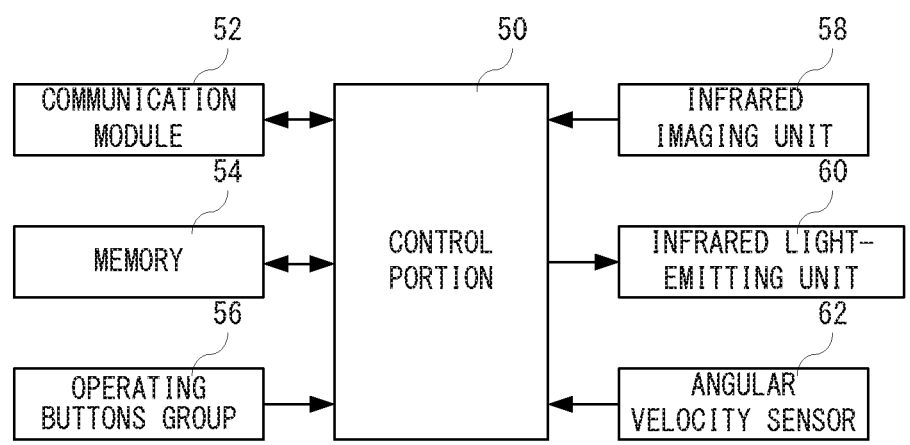
FIG. 4 is a block diagram showing a non-limiting example electric configuration of the input device shown in FIG. 1.

As shown in FIG. 4, the input device 14 includes a control portion 50 that is connected to a communication module 52, a memory 54, the operating buttons group 56, the infrared imaging unit 58, the infrared light-emitting unit 60 and the angular velocity sensor 62.

The control portion 50 is constituted by a microcomputer, for example, and performs overall control of the input device 14. The communication module 52 is provided in order to communicably connect with the game apparatus 12. As mentioned above, since the wireless communication system according to the standard of Bluetooth (Registered trademark) is adopted for the communication module 26 provided in the game apparatus 12, the communication module 52 also adopts a wireless communication system according to the standard of Bluetooth (Registered trademark). Therefore, the input device 14 transmits operation data to the game apparatus 12 according to the above-mentioned wireless communication system from the communication module 52.

The memory 54 is a nonvolatile storage medium such as a flash memory, and stores firmware and identification information of the input device 14 (hereinafter, referred to as "controller ID"). The control portion 50 performs various processing by executing the firmware stored in the memory 54. Moreover, the control portion 50 notifies the game apparatus 12 the controller ID when the input device 14 is communicably connected to the game apparatus 12. Although detailed description is omitted, the controller ID is added to the operation data, whereby the input device 14 as a transmission source of the operation data can be identified.

Information relating to an operation performed to the operating buttons group 56 (the operation data) is repeatedly output to the control portion 50 at a predetermined cycle. However, the operating buttons group 56 corresponds the above-mentioned various kinds of buttons or switches (56a-56i), and outputs to the control portion 50 an input situation with respect to the various kinds of buttons or switches (56a-56i), i.e., the operation data indicating whether or not the button or switch is depressed.

As mentioned above, the input device 14 is provided with the infrared imaging unit 58. The infrared imaging unit 58 has an infrared camera that images surroundings of the input device 14. As an example, the game apparatus 12 or the input device 14 calculates imaged information (for example, information relating to luminance of each of a plurality of blocks obtained by dividing at least a part of an area of imaged image), and determines a change of surroundings of the input device 14 based on the information. Moreover, although the infrared imaging unit 58 may image by ambient light, in this embodiment, the infrared imaging unit 58 has the infrared light-emitting unit 60 that irradiates the infrared light. The infrared light-emitting unit 60 irradiates the infrared light in synchronous with a timing that the infrared camera images an image, for example. Then, the infrared light that is irradiated by the infrared light-emitting unit 60 is reflected by an imaging target (subject), and the reflected infrared light is received by the infrared camera, thereby obtaining an infrared image. Thus, the infrared imaging unit 58 can obtain a clearer infrared image.

In addition, the infrared imaging unit 58 and the infrared light-emitting unit 60 may be respectively provided in the input device 14 as separate units, or may be provided in the input device 14 as a single unit incorporated in the same package. Moreover, although the infrared imaging unit 58 having an infrared camera is used in this embodiment, in other embodiments, instead of the infrared camera, a visible light camera (a camera using a visible light image sensor) may be used as the imaging unit.

The control portion 50 includes a CPU, a memory, etc., and performs, according to instructions from the game apparatus 12, control processing with respect to the infrared imaging unit 58 based on a predetermined program (for example, an application program for performing image processing and various kinds of arithmetic operations) that is stored in a storage device (not shown) provided in the input device 14. For example, the control portion 50 makes the infrared imaging unit 58 perform an imaging operation, or acquires and/or calculates information based on an imaging result (information of an imaged image, or information calculated from such information) so as to transmit to the game apparatus 12 via the communication module 52. Moreover, the control portion 50 performs control processing with respect to the infrared light-emitting unit 60 according to instructions from the game apparatus 12. For example, the control portion 50 controls light-emitting of the infrared light-emitting unit 60 according to instructions from the game apparatus 12. In addition, a memory that is used when the control portion 50 performs processing may be a memory provided in the control portion 50, or may be the memory 54.

The angular velocity sensor 62 is an inertia sensor, and detects an angular velocity around each of predetermined three axes (for example, x, y and z axes shown in FIG. 3A). The angular velocity sensor 62 is connected to the control portion 50. Then, a detection result of the angular velocity sensor 62 is repeatedly output to the control portion 50 at appropriate timings. Therefore, the game apparatus 12 can calculate information relating to a motion and/or posture of the input device 14 based on the operation data (specifically, the detection result of the angular velocity sensor 62).

Figure 5:
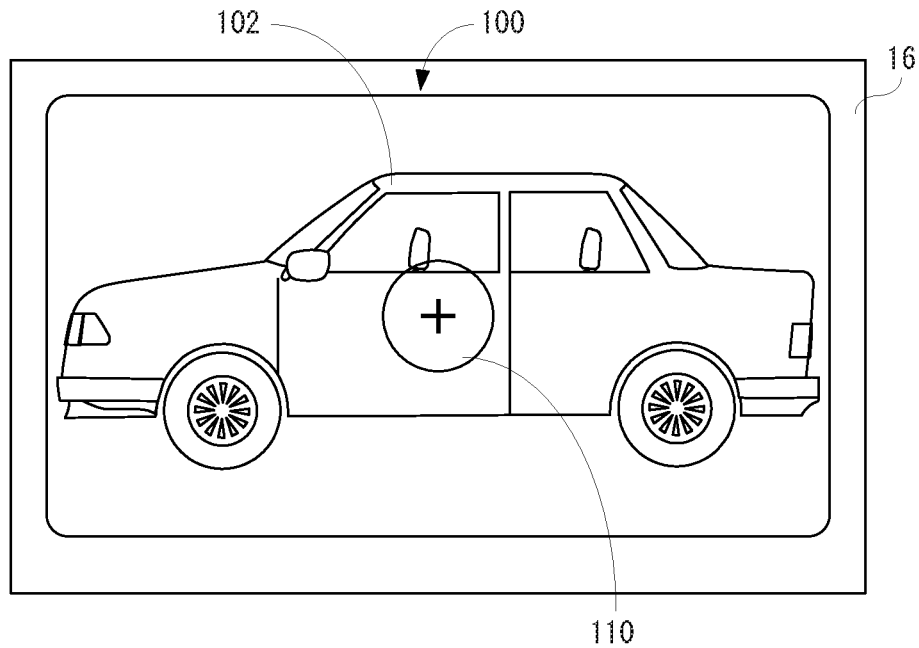
FIG. 5 is an illustration view showing a non-limiting example first coloring screen together with a coloring operation by a user.
Figure 5:
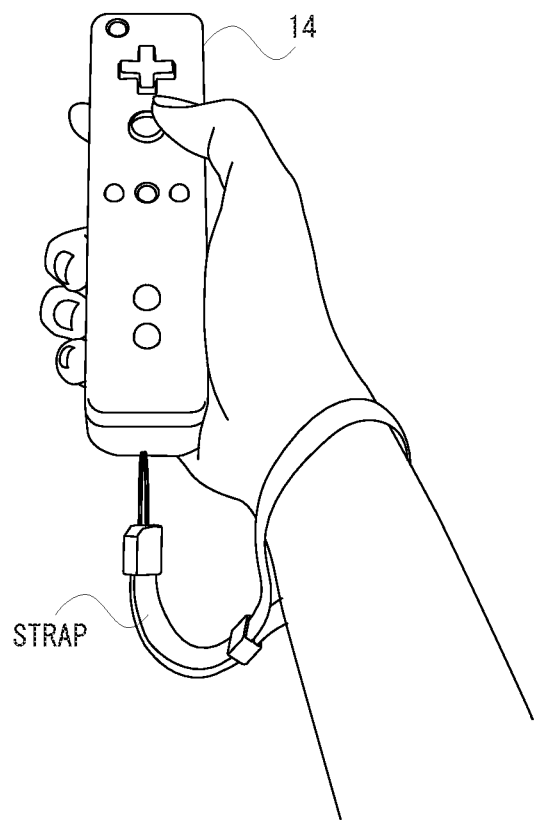

FIG. 5-FIG. 9 are drawings for explaining a non-limiting example coloring screen 100 and a non-limiting example coloring method, respectively. As shown in FIG. 5, the coloring screen 100 is displayed on the television 16, and includes an image of a virtual object imitating a car (hereinafter, referred to as "car object image") 102. At the beginning when the coloring screen 100 is displayed on the television 16, a cursor image 110 is displayed at the center of the screen.

In addition, the car object image 102 is an example, and an image of another virtual object may be displayed. Moreover, the image of the virtual object may be selected by the user. Furthermore, the image of the virtual object may be not only an object image of a finished product but also an object image of components.

Moreover, as shown in FIG. 5, the user performs a coloring operation while grasping or holding the input device 14 fixed by the strap in own hand. Although it is assumed that the user exists in the front of the television 16 in the examples shown in FIG. 5-FIG. 9, the user does not need to exist in the front of the television 16.

In this embodiment, when the A button 56b is operated, an area (or range) that is designated by the cursor image 110 in the car object image 102 is colored. In this embodiment, the cursor image 110 includes a circle and a cross indicative of a center position of this circle, and a color will be attached to an area corresponding to the circle. Moreover, in this embodiment, a color that is instructed by the input device 14 is superposed on a color having been attached to the car object image 102. However, a color that is instructed by the input device 14 may be attached instead of the color having been attached to the car object image 102. Therefore, color information of all or a part of the virtual object such as a car object is updated (or changed).

In addition, although illustration and detailed description are omitted, the color attached by using the input device 14 is a color selected from a plurality of colors, and can be selected from a color selecting menu.

Moreover, although this embodiment will be explained on a case where a virtual object image such as the car object image 102 is colored, a portion except the car object image 102 may be colored. As the portion except the car object image 102, a background or virtual canvas of the virtual object image corresponds.

The cursor image 110 is moved according to change of a direction of the input device 14. That is, by turning or moving the input device 14 by the user, it is possible to change a position or place to be colored in the virtual object image, in a direction that the virtual object image is being currently displayed. Specifically, when a direction of the tip end of the input device 14 is moved in a lateral direction, the yaw angle of the input device 14 changes and thus the cursor image 110 is moved according to change of this yaw angle. Moreover, when a direction of the tip end of the input device 14 is moved in a longitudinal direction, the pitch angle of the input device 14 changes and thus the cursor image 110 is moved in a longitudinal (or up and down) direction according to change of this pitch angle. Moreover, when a direction of the tip end of the input device 14 is moved in an oblique direction, the yaw angle and the pitch angle of the input device 14 change and thus the cursor image 110 is moved in an oblique direction according to change of the yaw angle and the pitch angle. That is, the input device 14 is also used as a pointing device. As mentioned above, the cursor image 110 is displayed in the center of the screen when the coloring screen 100 is initially displayed, and then, the display position is displaced (updated) based on the output of the angular velocity sensor 62.

Thus, since the cursor image 110 can change the position or place to be colored by turning or moving the input device 14, an operation for coloring is simple.

Moreover, by operating the cross key 56a, the position of the virtual camera (not shown) can be changed, by operating the − (minus) button 56d, the virtual camera can be zoomed-out, and by operating the + (plus) button 56e, the virtual camera can be zoomed-in.

A gazing point of the virtual camera is set at the center of the car object image 102, and by operating the cross key 56a, the virtual camera is moved along a surface of a sphere whose radius is a straight line connecting the gazing point and the position of the virtual camera (i.e., a viewpoint). Therefore, the car object image 102 is rotatable in the coloring screen 100. That is, it is possible to change a plane that the user wants to color in the virtual object image, or a plane that the user wants to see in the virtual object image.

Moreover, the position of the virtual camera is moved in a direction separating from the gazing point if the − (minus) button 56d is operated. On the other hand, the position of the virtual camera is moved in a direction approaching to the gazing point if the + (plus) button 56e is operated. That is, a distance from the gazing point to the viewpoint is changed. However, instead of changing the distance between the gazing point and the viewpoint, the angle of view of the virtual camera may be changed. That is, in the current direction, by enlarging and displaying the virtual object image, it is possible to color the virtual object image in detail or to see details of the virtual object image. Moreover, in the current direction, by reducing and displaying the virtual object image, it is possible to color the virtual object image in a wide range at once or to see the virtual object image entirely. A reason why a wide range can be colored at once is that an area that the cursor image 110 overlaps is larger than an area in a case where the virtual object image is enlarged and displayed.

Figure 6:
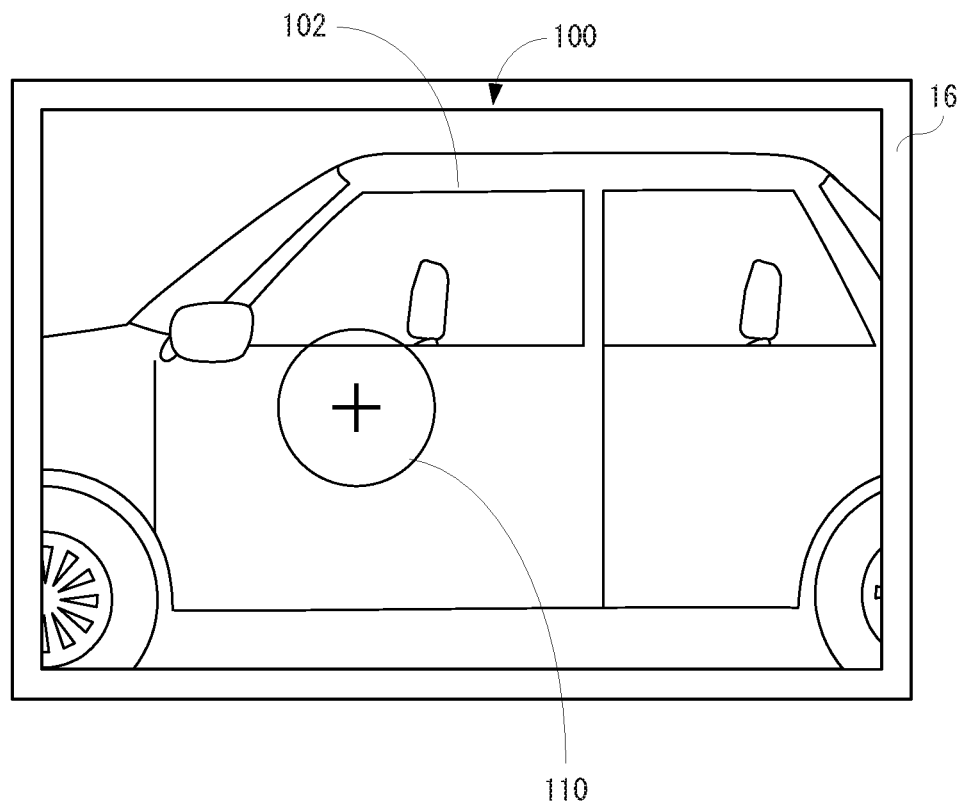
FIG. 6 is an illustration view showing a non-limiting example second coloring screen together with a coloring operation by the user.
Figure 6:
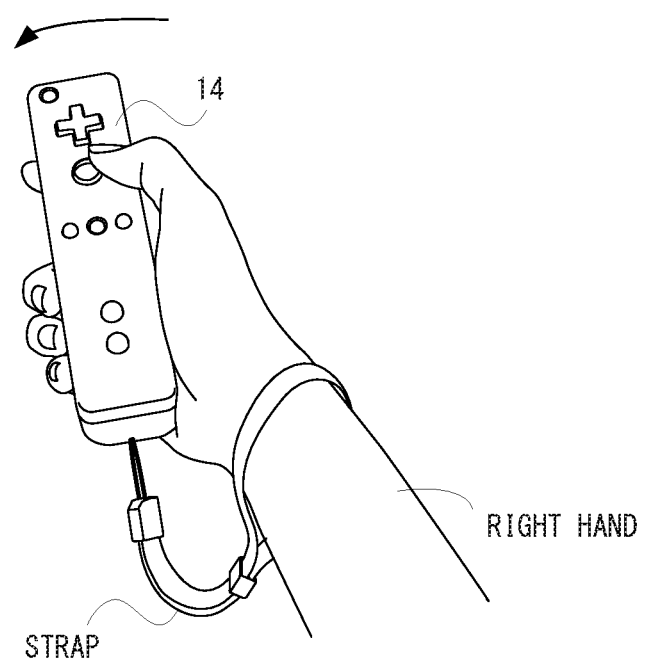

In the coloring screen 100 shown in FIG. 6, the car object image 102 is enlarged by operating the + (plus) button 56e in the coloring screen 100 shown in FIG. 5, and further, by turning the tip end of the input device 14 obliquely forward to the left, the cursor image 110 is moved to the left when seeing the television 16 from the front.

Since a portion of a door of the car object image 102 is enlarged in the coloring screen 100 shown in FIG. 6, it is possible for the user to see the details of the door or to color the portion of the door in a wide range.

Moreover, in this embodiment, it is possible to perform the coloring while a part of the car object image 102 is masked. That is, in coloring processing of this embodiment, regarding the coloring of the car object image 102, there are a mode that does not perform mask processing and a mode that performs the mask processing (hereinafter, referred to as "mask mode"). In this embodiment, the mask mode is set by operating the "1" button 56f. If the mask mode is set, an image that serves as a candidate (hereinafter, referred to as "candidate image") 120 of a mask image 130 (see FIG. 8) is generated based on an image that is imaged by the infrared imaging unit 58, and the candidate image 120 is superposed on an image corresponding to the coloring screen 100. That is, the coloring screen 100 that the candidate image 120 is arranged on the front side is displayed on the television 16.

Figure 7:
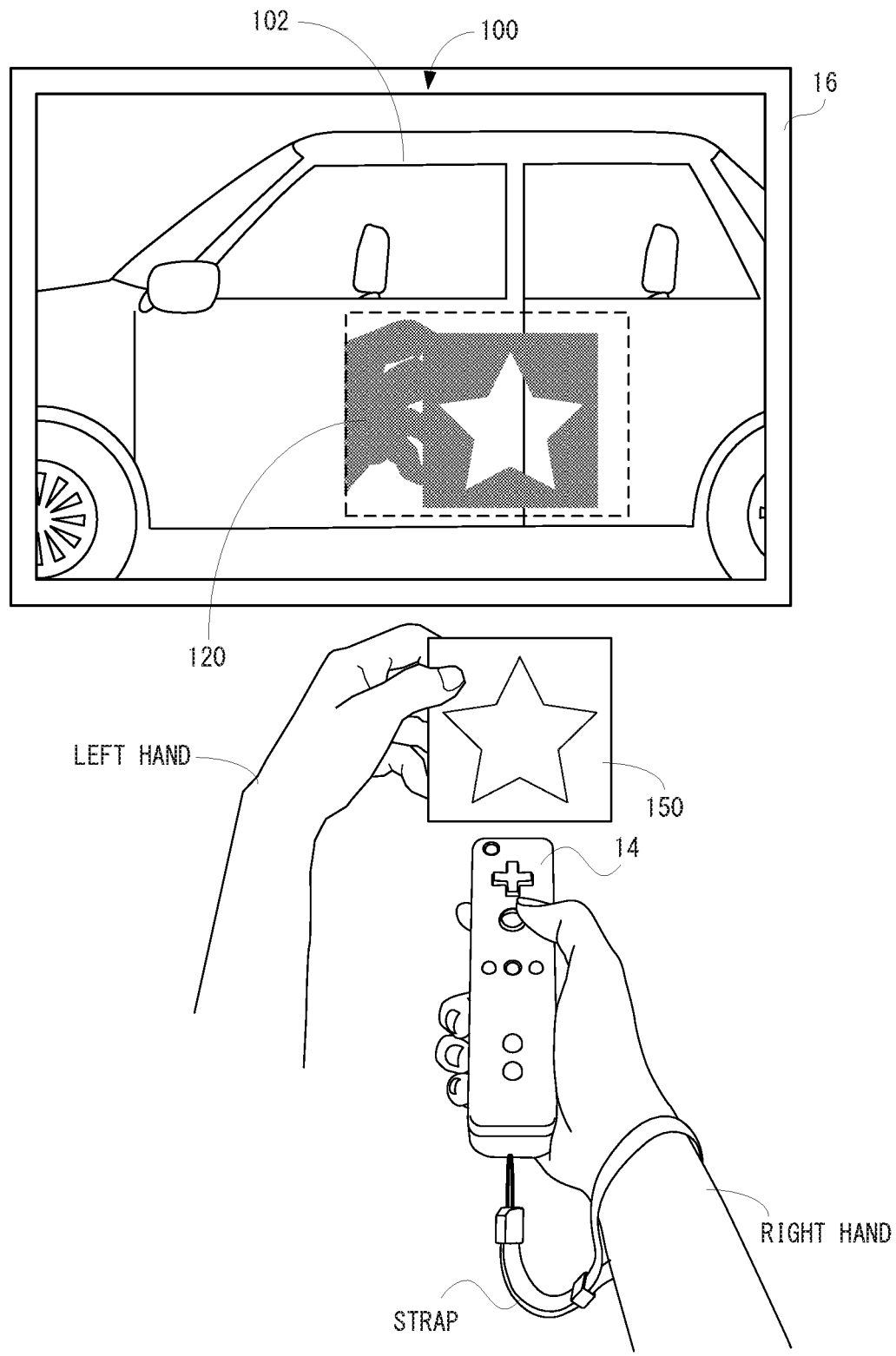
FIG. 7 is an illustration view showing a non-limiting example third coloring screen together with a coloring operation by the user.

FIG. 7 is an illustration view showing a non-limiting example coloring screen 100 in the mask mode. As shown in FIG. 7, the user holds with the left hand a pattern paper 150 that is prepared in advance, and holds up the pattern paper 150 in front of the tip end of the input device 14 so that the pattern paper 150 can be imaged by the infrared imaging unit 58.

The pattern paper 150 shown in FIG. 7 is an imaging target (or a subject for imaging), which is obtained by hollowing out a cardboard cut into a square of a predetermined size into a star shape. Therefore, in a state shown in FIG. 7, when the pattern paper 150 is imaged by the infrared imaging unit 58, the infrared light irradiated from the infrared light-emitting unit 60 is reflected by the pattern paper 150 and a part of the left hand of the user. In this embodiment, a candidate image 120 is generated by attaching a predetermined color (e.g., gray) to a portion of the image imaged by the infrared imaging unit 58 having the luminance equal to or larger than a certain value, and a portion having the luminance smaller than the certain value is made transparent (or transmitted). That is, the portion of the image imaged by the infrared imaging unit 58 having the luminance equal to or larger than the certain value is determined as a candidate of an area to be masked, and the portion having the luminance smaller than the certain value is excluded from a candidate of an area to be masked. The candidate image 120 is an original image of a mask image 130. Therefore, a predetermined color is also attached to the mask image 130. Accordingly, the user can visually recognize the mask image 130.

Moreover, in an example shown in FIG. 7, a dotted line frame is shown in addition to the candidate image 120 in order to planarly indicate a range corresponding to a range (or size) of the image that is imaged by the infrared imaging unit 58 when the candidate image is generated, but in an actual coloring screen 100, such a dotted line frame is not displayed. However, the dotted line frame may be displayed. This is also applied to a case of displaying the mask image 130.

A reason why a monochromatic predetermined color is thus attached to the candidate image 120 is for making the mask image 130 easier to be understood when the candidate image 120 is displayed as the mask image 130 as mentioned above. Therefore, the color to be attached to the candidate image 120 does not need to be fixed, a color to be colored or a different color from the color attached to the virtual object image. However, when displaying the candidate image 120 as the mask image 130, a color of the mask image 130 may be determined.

Moreover, as mentioned above, the candidate image 120 is an original image of the mask image 130, and the candidate image 120 and the mask image 130 are images corresponding to the subject (here, the pattern paper 150) in the real space, and the candidate image 120 and the mask image 130 are equivalent to a "first image".

In the mask mode, the candidate image 120 is displayed instead of the cursor image 110 until the mask image 130 becomes to be displayed, and the imaging range of the infrared imaging unit 58 is changed by turning or moving the input device 14 left and right and up and down. Therefore, since the imaging target is changed, or at least one of a position, a direction and a size to be imaged is changed even in the same imaging target, a shape (and a size) of the candidate image 120 and/or a position of the candidate image 120 can be changed. The user can change the shape of the candidate image 120 and/or the position of the candidate image 120 so as to display the mask image 130 having a desired shape (and size) at a desired position.

Thus, when changing the shape of the candidate image 120 and/or the position of the candidate image 120, at least the tip end of the input device 14 is moved. Therefore, when it is desired to change a position of the candidate image 120 but not desired to change a shape of the candidate image 120, for example, the user also moves the pattern paper 150 so as to follow a movement of the tip end of the input device 14.

When the candidate image 120 is arranged in the position desired by the user, and has the shape desired by the user, the user operates the A button 56b in order to color, and when the A button 56b is thus operated, the candidate image 120 is fixedly displayed in its current position as the mask image 130. In this embodiment, the mask image 130 means an image that the position of the candidate image 120 is fixed and the shape of the candidate image 120 is fixed.

In this embodiment, the candidate image 120 and the mask image 130 are thus distinguished from each other, but the candidate image 120 may be handled as the mask image 130 even before fixedly displayed.

Moreover, although fixedly display of the mask image 130 and a coloring instruction are performed in accordance with an operation of the A button 56b in this embodiment, the fixedly display of the mask image 130 and the coloring instruction may be performed in accordance with an operation of another button or switch.

Figure 8:
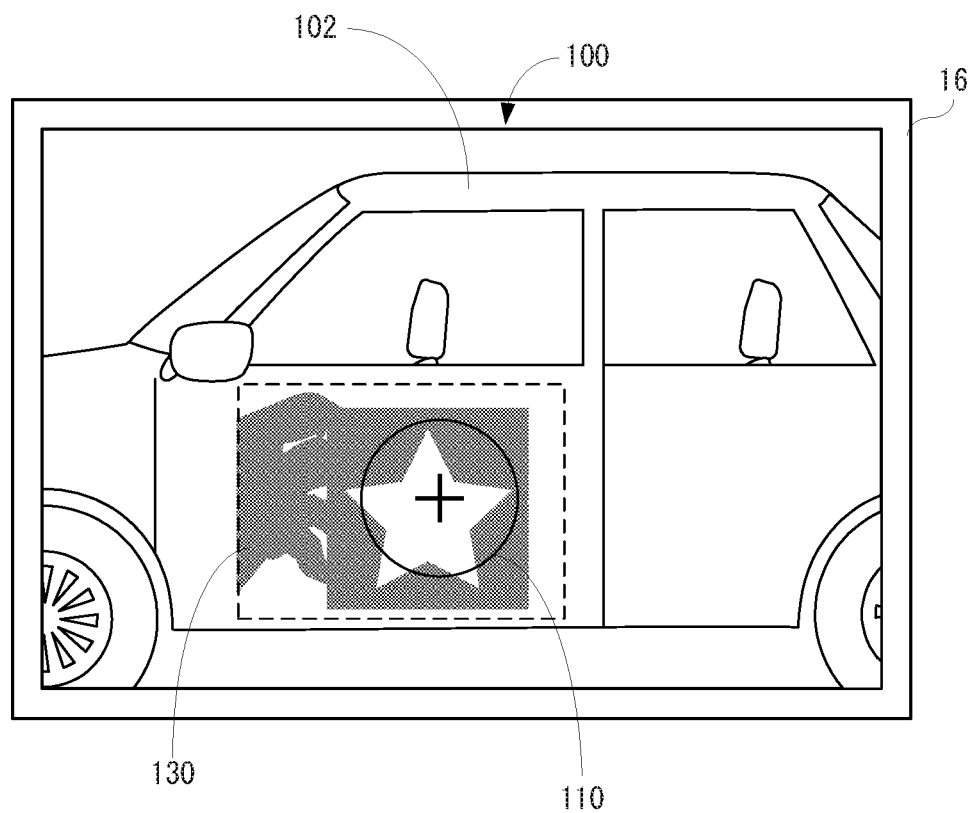
FIG. 8 is an illustration view showing a non-limiting example fourth coloring screen together with a coloring operation by the user.
Figure 8:
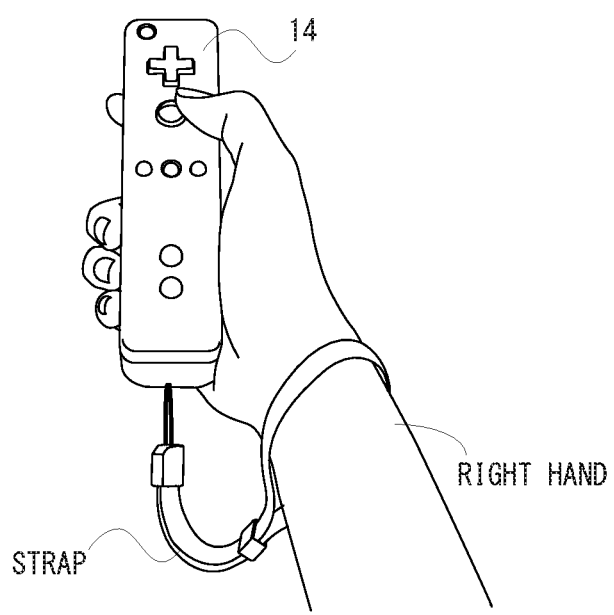

FIG. 8 is an illustration view showing a non-limiting example coloring screen 100 that includes the car object image 102, the cursor image 110 and the mask image 130 while fixedly displaying the mask image 130.

As shown in FIG. 8, when the mask image 130 is fixedly displayed, the cursor image 110 is displayed, and similar to a mode not the mask mode, an area to be colored is designated by this cursor image 110. When the user moves the cursor image 110 to a desired position with using the input device 14 and operates the A button 56b, a coloring instruction is input to the game apparatus 12. Then, if the cursor image 110 and the car object image 102 are superposed, color information of the car object image 102 corresponding to the area designated by the cursor image 110 is updated. That is, color information of the car object image 102 is not updated for an area (or a portion) that the cursor image 110 overlaps with the mask image 130. That is, update of the color information is restricted. On the other hand, color information of the car object image 102 is updated for an area (or a portion) that the cursor image 110 does not overlap with the mask image 130.

In addition, as can also be seen from FIG. 8, when the mask image 130 is fixedly displayed, there is no need to image the pattern paper 150.

If the A button 56b is operated in a state shown in FIG. 8, an area of the car object image 102 not overlapping with the mask image 130 in the area that is designated by the cursor image 110 is colored.

Figure 9:
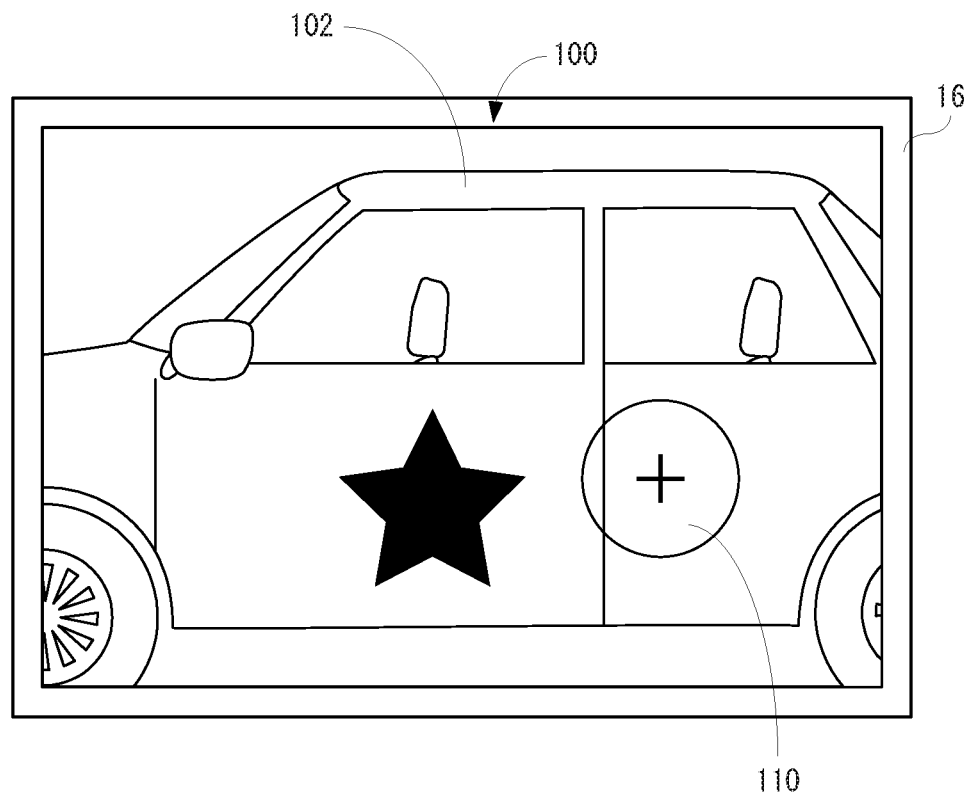
FIG. 9 is an illustration view showing a non-limiting example fifth coloring screen together with a coloring operation by a user.
Figure 9:
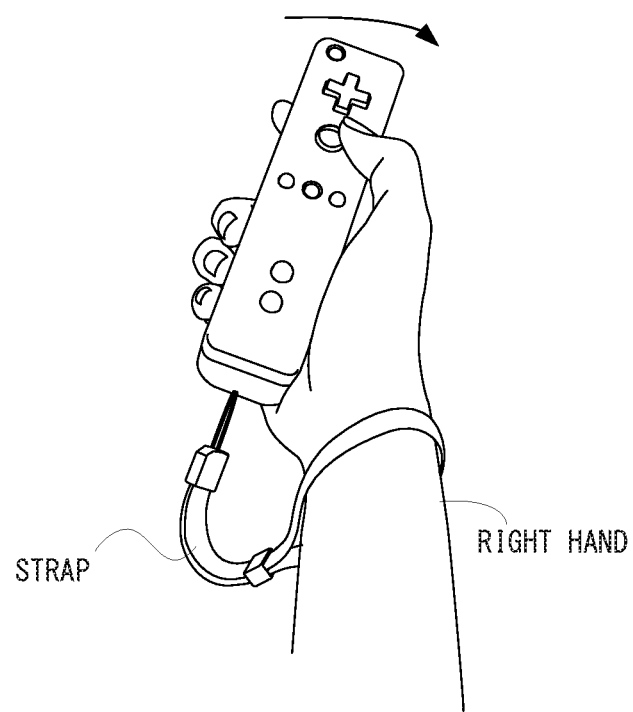

An area corresponding to a portion (or area) of the mask image 130 hollowed out into the star shape can be colored at a plurality of times while moving the cursor image 110 by the user, whereby the coloring screen as shown in FIG. 9 can be displayed on the television 16.

FIG. 9 shows a state where fixation of the mask image 130 as well as the mask mode are canceled after coloring of the star shape pattern, as mentioned later. Moreover, FIG. 9 shows a state where the tip end of the input device 14 is turned obliquely forward to the right after coloring the star shape pattern.

The candidate image 120 and the mask image 130 mentioned above are examples, and should not be limited. A shape of a hollowed-out portion of the pattern paper 150 may be a further predetermined shape. As the further predetermined shape, various shapes such as a predetermined figure, a shape of a predetermined animation character, a shape of a predetermined game character, a shape imitating a predetermined animal, etc. an be adopted. However, it is not necessary to be limited to the shape of the hollowed-out portion, and an external shape of the paper pattern 150 may be a further predetermined shape. In this case, a portion that is not colored is displayed in the further predetermined shape. That is, it is possible to attach a pattern having a shape of the pattern paper 150 by the portion that is not colored.

Moreover, as mentioned above, the candidate image 120 based on the image that images a subject in the real space such as the pattern paper 150 is generated and displayed, and the shape and/or the position of the candidate image 120 are fixedly displayed, so that the candidate image 120 is used as the mask image 130. Therefore, for example, it is possible for the user to use an image that the user images a thing existing around himself/herself or own left hand as the mask image 130 having the shape of the thing existing around himself/herself or own left hand. In this case, if the circumference of the mask image 130 is colored while putting this mask image 130 on the virtual object image, a pattern corresponding to the shape of this mask image 130 appears.

The mask image 130 is continued to be fixedly displayed until fixation of the mask image 130 is canceled. For example, the fixation of the mask image 130 is canceled by operating the B button 56i. Then, generation and display of the candidate image 120 are restarted. Moreover, when operating the "2" button 56g after the fixation of the mask image 130 is canceled, the mask mode is canceled.

Figure 10:
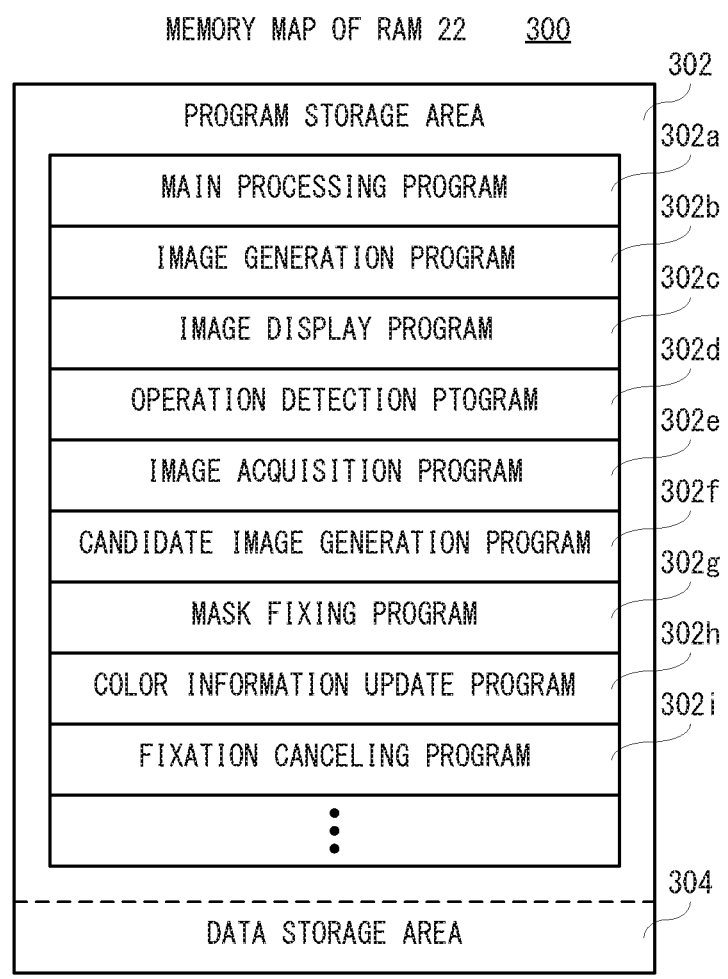
FIG. 10 is an illustration view showing a non-limiting example memory map of a RAM shown in FIG. 2.

FIG. 10 shows a non-limiting example memory map 300 of the RAM 22 of the game apparatus 12 shown in FIG. 2.

As shown in FIG. 10, the RAM 22 includes a program storage area 302 and a data storage area 304. The program storage area 302 is stored with graphics software that is an example of an information processing program, etc.

As shown in FIG. 10, the program storage area 302 is stored with a main processing program 302a, an image generation program 302b, an image display program 302c, an operation detection program 302d, an image acquisition program 302e, a candidate image generation program 302f, a mask fixing program 302g, a color information update program 302h, a fixation canceling program 302i, etc.

Although detailed description is omitted, each of the programs 302a-302i is read entirely or partly from the flash memory 24 to be stored in the RAM 22 at proper timings after the power of the game apparatus 12 is turned on.

Moreover, the image generation program 302b, the image display program 302c, the operation detection program 302d, the image acquisition program 302e, the candidate image generation program 302f, the mask fixing program 302g, the color information update program 302h and the fixation canceling program 302i are included in the graphics software. However, the image generation program 302b, the image display program 302c and the operation detection program 302d may not be included in the graphics software but may be stored in advance in the game apparatus 12.

The main processing program 302a is a program for performing processing of a main routine of the game apparatus 12. The image generation program 302b is a program for generating image data to be displayed corresponding to various screens such as the coloring screen 100 with using image generation data 304b mentioned later. The image display program 302c is a program for outputting the image data generated according to the image generation program 302b to the television 16 through the AV terminal 30 and the connection cable. Therefore, a screen corresponding to such image data is displayed on the television 16.

The operation detection program 302d is a program for detecting operation data that is input or transmitted from the input device 14. The image acquisition program 302e is a program for sequentially acquiring information based on imaging results input or transmitted from the input device 14. The candidate image generation program 302f is a program for generating, when the mask mode is set, the candidate image 120 from the information based on the imaging results sequentially acquired in accordance with the image acquisition program 302e.

The mask fixing program 302g is a program for fixedly displaying, when operation data detected in accordance with the operation detection program 302d indicates mask fixation, the candidate image 120 generated in accordance with the candidate image generation program 302f as the mask image 130.

The color information update program 302h is a program for updating the color information in the area of the cursor image 110 when the operation data detected in accordance with the operation detection program 302d indicates a coloring instruction. However, when the mask image 130 is being displayed, even in the area that cursor image 110 designates, the color information of a portion that the mask image 130 is superposed is not updated.

The fixation canceling program 302i is a program for erasing the mask image 130 when the operation data detected in accordance with the operation detection program 302d indicates fixation cancel of the mask image 130. Therefore, if the fixation of the mask image 130 is canceled, processing according to the candidate image generation program 302f is restarted. However, when the mask mode is canceled, the generation and display of the candidate image 120 are also ended.

In addition, the program storage area 302 is further stored with a color selection program for selecting a color to be used for the coloring, a sound output program for outputting a sound such as BGM etc., a communication program for performing communication with other equipment, a backup program for storing data in a nonvolatile storage medium such as a flash memory 24, etc.

Figure 11:
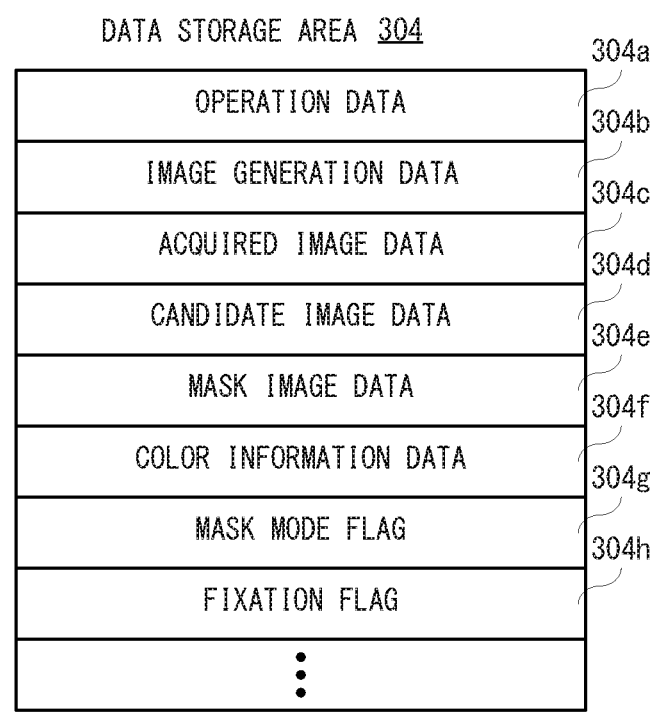
FIG. 11 is an illustration view showing a non-limiting example data storage area shown in FIG. 10.

FIG. 11 is an illustration view showing an example of specific contents of the data storage area 304 shown in FIG. 10. The data storage area 304 is stored with operation data 304a, image generation data 304b, acquired image data 304c, candidate image data 304d, mask image data 304e, color information data 304f, etc. Moreover, the data storage area 304 is provided with a mask mode flag 304g, a fixation flag 304h, etc.

The operation data 304a is data indicating an operation by the user to the input device 14, and as mentioned above, the operation data is transmitted from the input device 14 to the game apparatus 12 to be stored in the RAM 22. Moreover, the operation data 304a having been used for processing by the processor 20 is erased from the RAM 22.

The image generation data 304b is data required in order to generate image data, such as polygon data, texture data, etc. The acquired image data 304c is data about the information based on the imaging result that is transmitted from the input device 14 in the mask mode. The candidate image data 304d is data of the candidate image generated according to the acquired image data 304c.

The mask image data 304e is data of the mask image, and the candidate image data 304d is stored as the mask image data 304e at the time when fixation of the mask image is instructed. The color information data 304f is data of the color information of the color that is attached to the car object image 102 included in the coloring screen 100.

The mask mode flag 304g is a flag for determining whether it is in the mask mode, and is turned on in the mask mode and turned off not in the mask mode. The fixation flag 304h is a flag for determining whether the mask image 130 is being fixed, and is turned on when the mask image 130 is being fixed and turned off when the mask image 130 is not being fixed.

Although illustration is omitted, the data storage area 304 is stored with other data required for performing the information processing, and provided with other flags and counters (timers) required for performing the information processing.

FIG. 12-FIG. 15 are flowcharts showing non-limiting example coloring processing of the processor 20 provided in the game apparatus 12 shown in FIG. 2. However, the coloring processing is processing of a part of the graphics software. In addition, it is pointed-out in advance that processing in respective steps in the flowcharts shown in FIG. 12 (also in FIG. 13-FIG. 15) are mere examples, and as long as the same result is obtained, an order of the respective steps may be changed. Moreover, in this embodiment, basically, it is assumed that the processor 20 performs the processing of the respective steps of the flowcharts shown in FIGS. 12-FIG. 15; however, some steps may be performed by a processor(s) or a dedicated circuit(s) other than the processor 20.

If the power of the game apparatus 12 is turned on, prior to performing of whole processing, the processor 20 executes a boot program stored in a boot ROM not shown, whereby respective units such as the RAM 22, etc. are initialized. If the execution of graphics software and performing of the coloring processing are instructed by the user, the game apparatus 12 starts the coloring processing.

Although the coloring processing is explained in the following, it should be noted that in parallel to this coloring processing, update processing that updates a position of the cursor image 110 and camera control processing that controls the virtual camera are also performed. Although illustration and detailed description are omitted on the update processing and the camera control processing, in the update processing, the processor 20 detects a movement of the input device 14 in the lateral direction and/or the longitudinal direction based on the output of the angular velocity sensor 62, and updates the position of the cursor image 110 according thereto. However, the position of the candidate image 120 is updated based on the output of the angular velocity sensor 62 when the candidate image 120 is displayed but the cursor image 110 is not displayed. At this time, the candidate image 120 is arranged so that the position of the center of the candidate image 120 overlaps with the position equivalent to the position of the center of the cursor image 110. This is an example and should not be limited. The candidate image 120 may be arranged so that the position of the center of the range (the dotted line frame shown in FIG. 7) equivalent to the image imaged by the infrared imaging unit 58 overlaps with the position equivalent to the position of the center of the cursor image 110. Moreover, in the camera control processing, the processor 20 controls the position and zooming of the virtual camera according to operations of the cross key 56a, the − (minus) button 56d and the + (plus) button 56e.

Figure 12:
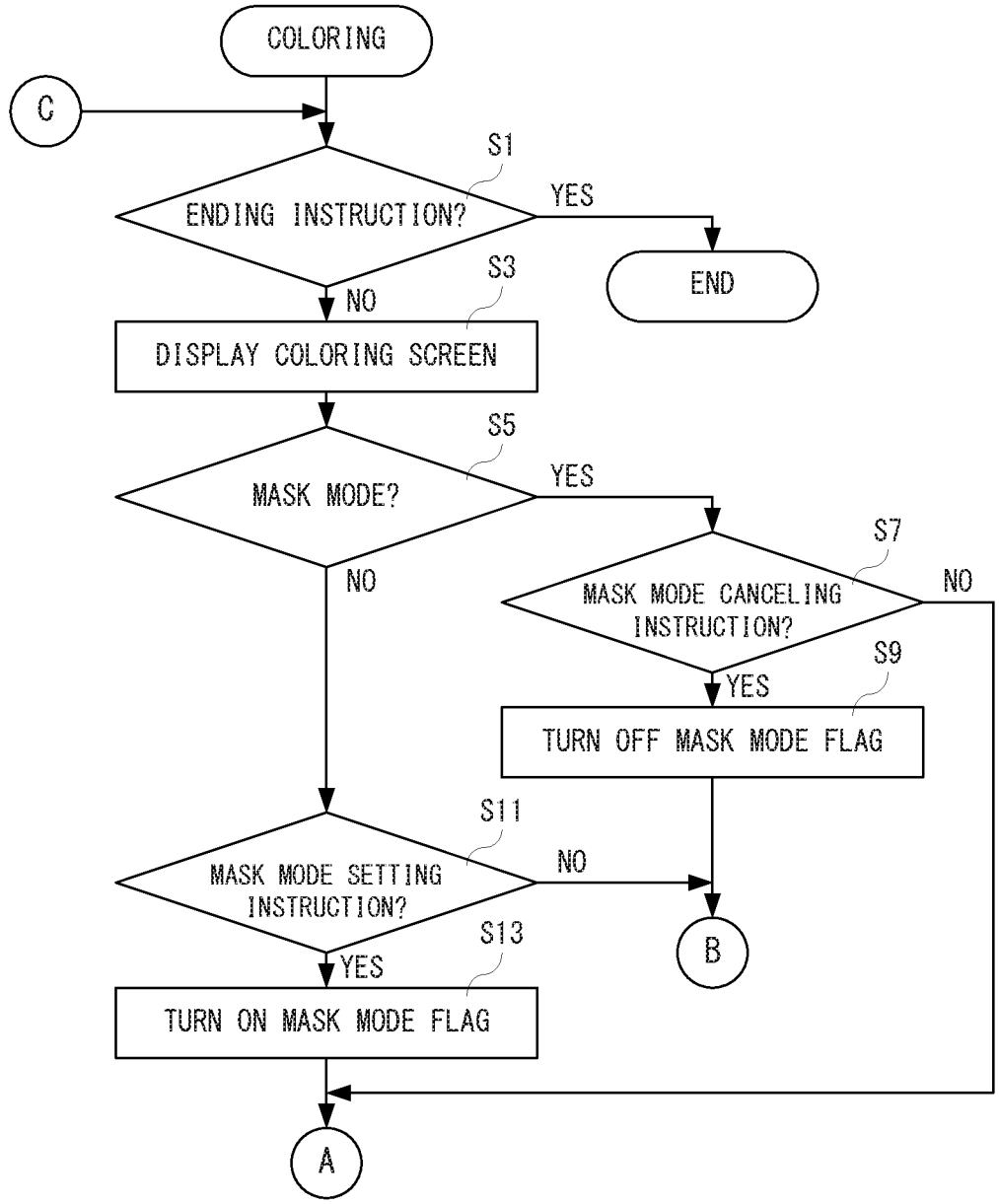
FIG. 12 is a flowchart showing a part of non-limiting example coloring processing of a processor shown in FIG. 2.

As shown in FIG. 12, if the coloring processing is started, the processor 20 determines, in a step S1, whether there is an ending instruction. Here, the processor 20 determines whether the home button 56c is operated to display the menu and further whether the ending is selected.

If "YES" is determined in the step S1, that is, if there is the ending instruction, the coloring processing is ended. On the other hand, if "NO" is determined in the step S1, that is, if there is no ending instruction, the coloring screen 100 as shown in FIG. 4 is displayed on the television 16 in a step S3. However, at the beginning of the coloring processing, an initial screen of the coloring screen 100 is displayed in the step S3. At this time, the color information data 304f corresponding to the information on the color attached to the car object image 102, i.e., the color of the initial state is stored in the data storage area 304 of the RAM 22.

In a next step S5, it is determined whether the mask mode is being set. Here, the processor 20 determines whether the mask mode flag 304g is turned on. If "YES" is determined in the step S5, that is, if the mask mode is being set, it is determined, in a step S7, whether there is a canceling instruction of the mask mode. Here, the processor 20 determines whether the "2" button 56g *is operated.*

Figure 13:
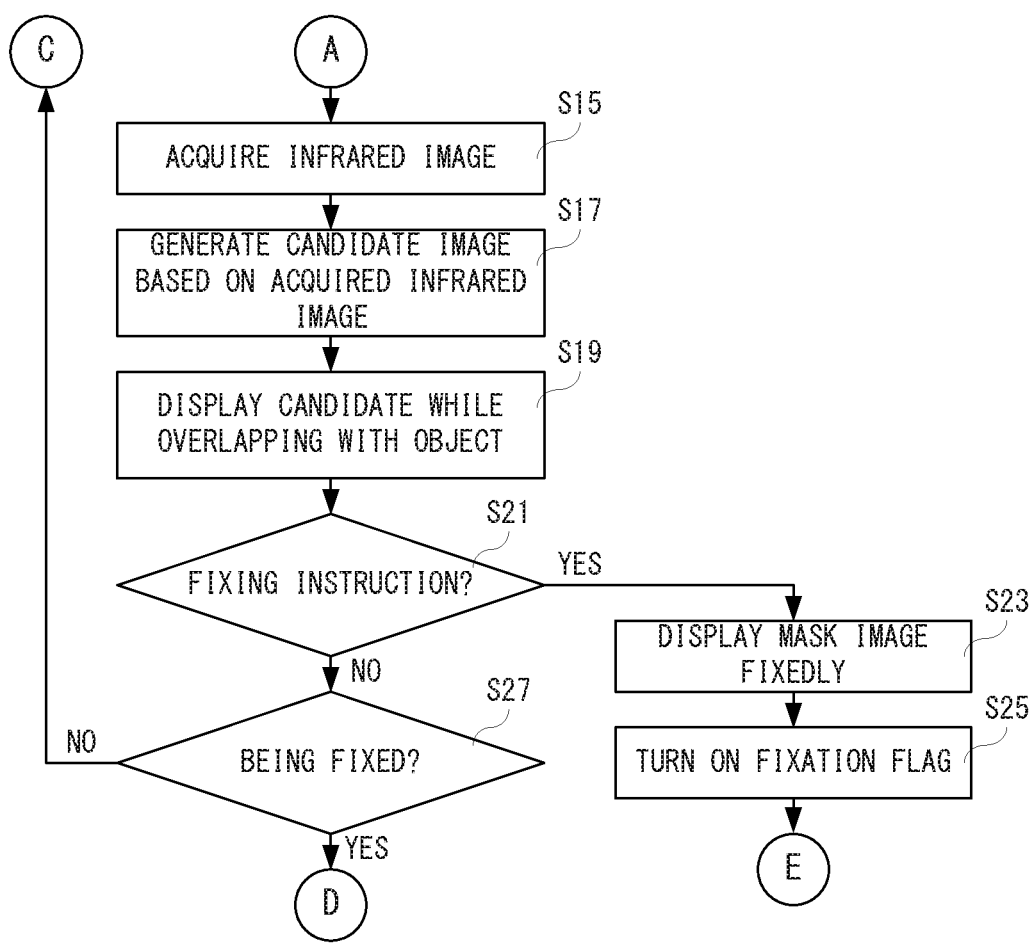
FIG. 13 is a flowchart showing another part of the coloring processing of the processor shown in FIG. 2, following FIG. 12.

If "NO" is determined in the step S7, that is, if there is no canceling instruction of the mask mode, the process proceeds to a step S15 shown in FIG. 13. On the other hand, if "YES" is determined in the step S7, that is, if there is the canceling instruction of the mask mode, the mask mode flag 304g is turned off in a step S9, and the process proceeds to a step S39 shown in FIG. 15.

Moreover, if "NO" is determined in the step S5, that is, if it is not in the mask mode, it is determined, in a step S11, whether there is a setting instruction of the mask mode in a step S11. Here, the processor 20 determines whether the "1" button 56f is operated. If "NO" is determined in the step S11, that is, if there is no setting instruction of the mask mode, the process proceeds to the step S39. On the other hand, if "YES" is determined in the step S11, that is, if there is the setting instruction of the mask mode, the mask mode flag 304g is turned on in a step S13, and the process proceeds to the step S15.

As shown in FIG. 13, in the step S15, an infrared image is acquired. That is, in this step S15, the processor 20 acquires information based on an imaging result from the infrared imaging unit 58. In a next step S17, the candidate image 120 is generated from the acquired infrared image, i.e., the information based on the imaging result acquired from the infrared imaging unit 58. Subsequently, in a step S19, the candidate image 120 is superposed on the image of the coloring screen 100 including the car object image 102. However, if the candidate image 120 is displayed, the cursor image 110 is erased or becomes not to be displayed.

Then, it is determined whether there is a fixing instruction in a step S21. Here, the processor 20 determines whether the A button 56b is operated. If "YES" is determined in the step S21, that is, if there is the fixing instruction, the mask image 130 is fixedly displayed in a step S23. In this step S23, the processor 20 makes the candidate image 120 at the time when the fixing instruction is input be the mask image 130, and fixes this mask image 130 in a currently displayed position. In a next step S25, the fixed flag 304h is turned on, and the process proceeds to a step S33 shown in FIG. 14.

On the other hand, if "NO" is determined in the step S21, that is, if there is no fixing instruction, it is determine, in a step S27, whether the mask image 130 is being fixed. Here, the processor 20 determines whether the fixation flag 304h is turned on.

If "NO" is determined in the step S27, that is, if the mask image 130 is not being fixed, the process returns to the step S1 shown in FIG. 12. If "YES" is determined in the step S27, that is, if the mask image 130 is being fixed, the process proceeds to a step S29 shown in FIG. 14.

In this embodiment, a scan time from the step S1 to the step S27 is 1 (one) frame. However, 1 (one) frame is a unit time for updating the screen, and is 30 fps or 60 fps, for example. Therefore, in the mask mode, the infrared images are sequentially acquired and thus the candidate image 120 is also sequentially updated until the fixing instruction is input.

Figure 14:
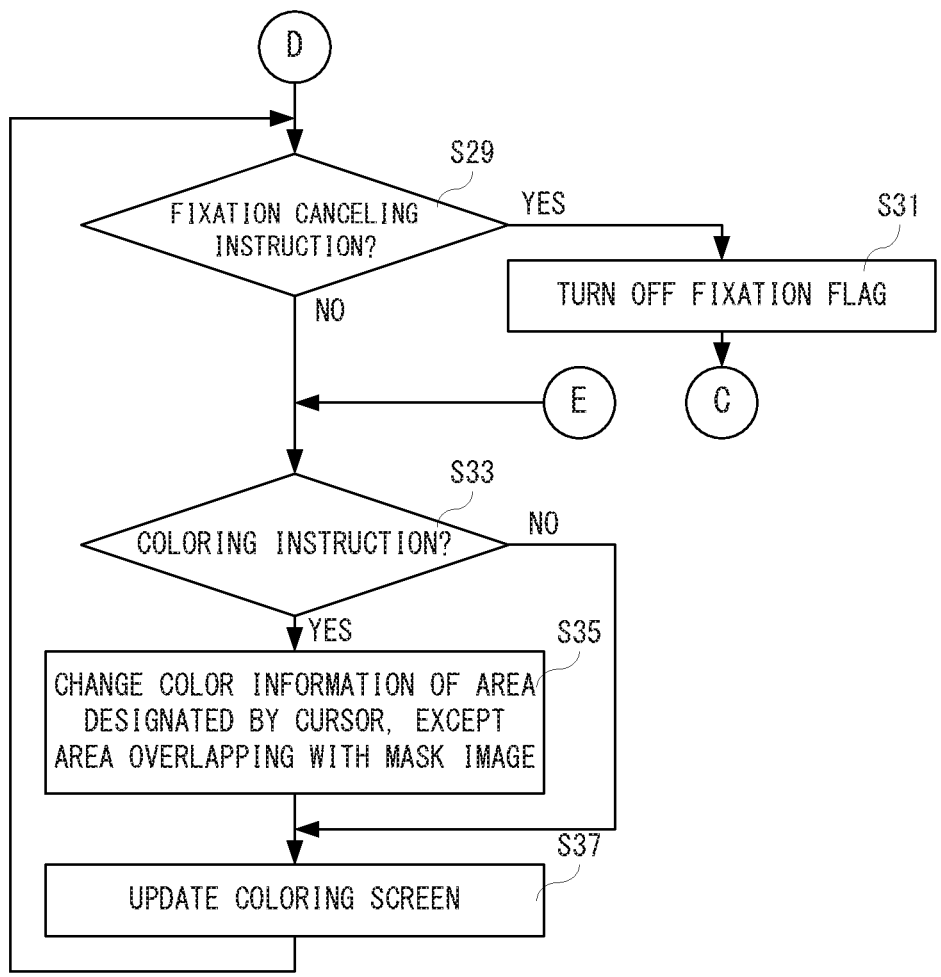
FIG. 14 is a flowchart showing a further part of the coloring processing of the processor shown in FIG. 2, following FIG. 13.

As shown in FIG. 14, in the step S29, it is determined whether there is a fixation canceling instruction. Here, the processor 20 determines whether the B button 56i is operated. If "YES" is determined in the step S29, that is, if there is the fixation canceling instruction, the fixation flag 304h is turned off in a step S31, and the process returns to the step S1.

On the other hand, if "NO" is determined in the step S29, that is, if there is no fixation canceling instruction, it is determined, in the step S33, whether there is a coloring instruction. Here, the processor 20 determines whether the A button 56b is operated. This is true for the step S39 mentioned later.

If "NO" is determined in the step S33, that is, if there is no coloring instruction, the process proceeds to a step S37. On the other hand, if "YES" is determined in the step S33, that is, if there is the coloring instruction, in a step S35, the color information of the area of the car object image 102 designated by the cursor image 110 is updated except for the area overlapping with the mask image 130, and the process proceeds to a step S37. In the step S37, the coloring screen 100 is updated. Therefore, the color information of a part of the car object image 102 is updated. Then, the process returns to the step S29.

Figure 15:
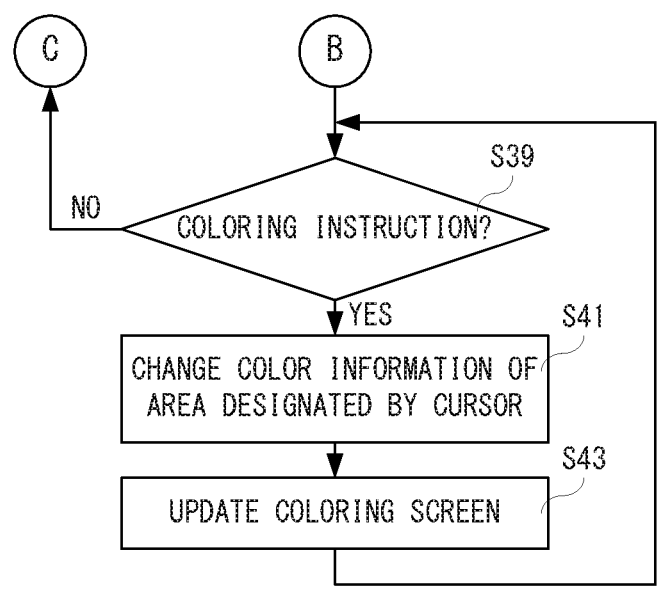
FIG. 15 is a flowchart showing the other part of the coloring processing of the processor shown in FIG. 2, following FIG. 12.

Moreover, as mentioned above, when the mask mode is not being set, it is determined whether there is a coloring instruction in the step S39 of FIG. 15. If "NO" is determined in the step S39, the process returns to the step S1. On the other hand, if "YES" is determined in the step S39, in a step S41, the color information of the area of the car object image 102 designated by the cursor image 110 is updated, and the process returns to the step S39 after the coloring screen 100 is updated in a step S43.

According to this embodiment, since the candidate image of the mask image is generated based on the information acquired in the infrared imaging unit, and the virtual object is colored using the mask image that is determined based on this generated candidate image, an operation is simple. Therefore, it is possible to easily update the color information of the image of the virtual object.

In addition, in this embodiment, when the coloring instruction is input, all the color information in the area of the car object image designated by the cursor image is updated at once except for the area overlapping with the mask image, but a part of the color information to be updated at once. For example, when reproducing a manner that a misty paint is sprayed from a virtual spray canister, the misty paint is sprayed from the virtual spray canister to the virtual object image, whereby an area designated by the cursor image can be gradually colored. When the misty paint is thus sprayed from the virtual spray canister and thus the object is colored, the object is continuously colored during when the A button is being operated. In such a case, in response to a fact that the A button becomes not to be operated in the mask mode, the coloring is ended and the fixation of the mask image may be canceled. That is, the mask image may be fixedly displayed only during when the A button is being operated.

Moreover, in this embodiment, if the A button is operated when the candidate image is being displayed, the mask image is displayed in manner that the position of the candidate image and the shape of the candidate image are fixed, but it does not need to be limited to this. In other embodiments, the mask image may be displayed in a manner that the shape of the candidate image is fixed but the position of the candidate image is not fixed. In such a case, if the input device is moved or turned, the mask image will be moved together with the cursor image according thereto.

Furthermore, although this embodiment is explained on a case where the virtual object image is colored, it does not need to be limited to this. Also when removing (erasing) a color that is attached or colored in advance to the virtual object image, a mask image may be set according to the same or similar way. In such a case, the color of a portion or area designated by the cursor image will be removed, but by using the mask image, the color is not removed in an area (or portion) of the virtual object image overlapping with the mask image. That is, it is possible to remove the color of a desired portion in the virtual object image. When removing a color, the color information of the virtual object image is updated.

Furthermore, although the infrared image is acquired every frame, and in response thereto, the candidate image is updated in this embodiment, the acquisition of the infrared image and/or the update of the candidate image may be performed every several frames or every tens of frames.

Moreover, in this embodiment, since the mask image is displayed so that that the center thereof is overlapped with the center of the cursor image, the mask image is fixed with respect to the coloring screen (television 16), but it does not need to be limited to this. The mask image is displayed so that that the center thereof is overlapped with the center of the cursor image, and the mask image may be fixed with respect to the virtual object image or an image corresponding to the coloring screen.

Furthermore, although this embodiment is explained on a case where the infrared camera is used, if a visible light camera is used, binarization processing is performed on an imaged image, whereby the candidate image 120 can be generated, in which a predetermined color is attached to a portion having a luminance equal to or larger than a certain value and a portion having a luminance less than the certain value is made transparent. However, the portion attached with the predetermined color functions as the mask image.

Furthermore, in this embodiment, the candidate image 120 is generated so as to mask a portion corresponding to the subject that is an imaging target (subject) in the image imaged by the infrared imaging unit, but the candidate image 120 may be generated so as to mask a portion other than the portion corresponding to the subject. In this case, when generating the candidate image 120, a portion having a luminance equal to or larger than a certain value is made transparent, and a predetermined color is attached to a portion having a luminance smaller than the certain value. This is also the same as when using a visible light camera. Moreover, the candidate image 120 that is generated so as to mask a portion other than the portion corresponding to the subject is an original image of the mask image 130, and both the mask image 130 and the candidate image 120 are images corresponding to the subject in the real space and thus equivalent to the "first image".

Moreover, although by using the input device as a pointing device, the cursor image is moved by moving the input device, it does not need to be limited to this. The cursor image may be moved by using the cross key of the input device. In such a case, after moving the virtual camera by using another input device or setting a mode that the virtual camera is moved in an input device, the cursor image may be moved by using the cross key. Otherwise, by providing another input means such as an analog stick on the input means, and the cursor image may be moved with using this analog stick.

It should be noted that the specific numerical values and the screens shown in the above-mentioned embodiments are merely examples and can be appropriately changed in accordance with actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory storage medium storing an information processing program executable by a computer of an information processing apparatus, wherein the information processing program causes one or more processors of the computer to provide execution comprising:
   sequentially acquiring images including at least a subject in a real space from an imaging device configured to image the subject;
   displaying, on a display portion, a first image corresponding to the subject included in the images, and a second image that is different from the first image, the first image including a mask image;
   updating color information of the second image from a first color to a second color; and
   restricting, when there is an overlapping area created by the mask image, update of the color information of the second image, from the first color to the second color, in at least a part of the overlapping area created by the mask image, wherein
   the color information of the second image is maintained in the first color in the part of the overlapping area created by the mask image after the mask image ceases to overlap the second image.

2. The non-transitory storage medium according to the claim 1, wherein the information processing program further causes the one or more processors to provide execution comprising fixing a display position of the first image.

3. The non-transitory storage medium according to the claim 2, wherein the information processing program further causes the one or more processors to provide execution comprising determining whether an input device receives an updating instruction by a user, and fixing the display position of the first image when the input device receives the updating instruction by the user.

4. The non-transitory storage medium according to the claim 2, wherein the information processing program further causes the one or more processors to provide execution comprising determining whether an input device receives an updating instruction by a user; and canceling the fixation of the display position of the first image when the updating instruction by the user is not received after fixing the display position of the first image.

5. The non-transitory storage medium according to the claim 1, wherein the information processing program further causes the one or more processors to provide execution comprising fixing a display position of the first image when the color information of the second image is being updated.

6. The non-transitory storage medium according to the claim 1, wherein the information processing program further causes the one or more processors to provide execution comprising fixing a shape of the first image when the color information of the second image is being updated.

7. The non-transitory storage medium according to the claim 1, wherein the imaging device is an infrared imaging device.

8. The non-transitory storage medium according to the claim 1, wherein an image of a virtual object is displayed on the display portion as the second image, and the color information of the image of the virtual object is updated.

9. The non-transitory storage medium according to the claim 1, wherein the information processing program further causes the one or more processors to provide execution comprising acquiring an input coordinate based on an output from a pointing device, and updating the color information of a portion corresponding to the input coordinate in the second image.

10. The non-transitory storage medium according to the claim 9, wherein the pointing device comprises at least one of a motion sensor and an imaging device, and the input coordinate is acquired based on motion data detected by the at least one of the motion sensor and the imaging device.

11. The non-transitory storage medium according to the claim 1, wherein the second image is updated to the second color in a portion of the second image outside of the overlapping area.

12. The non-transitory storage medium according to the claim 1, wherein the mask image overlaps the second image based on a coloring operation input by a user, and the mask image is removed from display when the coloring operation is ended by the user.

13. The non-transitory storage medium according to the claim 1, wherein the mask image corresponds to an object, in the real space, positioned in front of an infrared camera of the imaging device.

14. An information processing system, comprising:
an input device having an imaging device configured to image a subject in a real space; and
processing circuitry having at least one processor, the processing circuitry configured to:
sequentially acquire images including at least the subject from the input device;
display, on a display portion, a first image corresponding to the subject included in the image, and a second image different from the first image, the first image including a mask image;
update color information of the second image from a first color to a second color; and
restrict, when there is an overlapping area created by the mask image, update of the color information of the second image, from the first color to the second color, in at least a part of the overlapping area created by the mask image, wherein
the color information of the second image is maintained in the first color in the part of the overlapping area created by the mask image after the mask image ceases to overlap the second image.

15. The information processing system according to the claim 14, wherein the input device comprises a motion sensor configured to output motion data indicative of a motion of the input device, and the processing circuitry is further configured to:
acquire a coordinate in a predetermined plane according to the motion data;
fix a display position of the first image when the color information of the second image is updated;
update the color information of a portion in the second image corresponding to the coordinate; and
restrict, when there is an overlapping area of the first image and the second image, update of the color information of the second image in at least the part of the overlapping area.

16. An information processing apparatus, comprising:
a processor; and
a memory configured to store computer readable instructions that, when executed by the processor, cause the information processing apparatus to:
sequentially acquire images including at least a subject in a real space from an imaging device configured to image the subject;
display, on a display portion, a first image corresponding to the subject included in the image, and a second image different from the first image, the first image including a mask image;
update color information of the second image from a first color to a second color; and
restrict, when there is an overlapping area created by the mask image, update of the color information of the second image, from the first color to the second color, in at least a part of the overlapping area created by the mask image, wherein
the color information of the second image is maintained in the first color in the part of the overlapping area created by the mask image after the mask image ceases to overlap the second image.

17. An information processing method implemented using an information processing apparatus having at least one processor, the information processing method comprising:
sequentially acquiring images including at least a subject in a real space from an imaging device configured to image the subject;
displaying, on a display portion, a first image corresponding to the subject included in the image, and a second image different from the first image, the first image including a mask image;
updating color information of the second image from a first color to a second color; and
restricting, when there is an overlapping area created by the mask image, update of the color information of the second image, from the first color to the second color, in at least a part of the overlapping area created by the mask image, wherein
the color information of the second image is maintained in the first color in the part of the overlapping area created by the mask image after the mask image ceases to overlap the second image.

* * * * *